(12) United States Patent
Yoshimura et al.

(10) Patent No.: US 11,259,319 B2
(45) Date of Patent: Feb. 22, 2022

(54) TERMINAL APPARATUS, BASE STATION APPARATUS, AND COMMUNICATION METHOD USING MODULATION AND CODING SCHEME TABLE

(71) Applicants: SHARP KABUSHIKI KAISHA, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP); Taewoo Lee, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 2 days.

(21) Appl. No.: 16/966,880

(22) PCT Filed: Jan. 22, 2019

(86) PCT No.: PCT/JP2019/001868
§ 371 (c)(1),
(2) Date: Jul. 31, 2020

(87) PCT Pub. No.: WO2019/151051
PCT Pub. Date: Aug. 8, 2019

(65) Prior Publication Data
US 2021/0045145 A1 Feb. 11, 2021

(30) Foreign Application Priority Data
Feb. 1, 2018 (JP) .............................. JP2018-016262

(51) Int. Cl.
*H04W 4/00* (2018.01)
*H04W 72/12* (2009.01)
(Continued)

(52) U.S. Cl.
CPC ....... *H04W 72/1289* (2013.01); *H04L 1/0003* (2013.01); *H04L 1/0061* (2013.01);
(Continued)

(58) Field of Classification Search
None
See application file for complete search history.

(56) References Cited

U.S. PATENT DOCUMENTS 10,015,036 B2 * 7/2018 Davydov .............. H04L 5/0057
10,075,309 B2 * 9/2018 Chen ..................... H04L 1/0016
(Continued)

FOREIGN PATENT DOCUMENTS

EP        3490324 A1    5/2019
WO    2017/196067 A1    1/2017
(Continued)

OTHER PUBLICATIONS

WO 2017/171956, (Hong He, May 2017, Intel IP Corportion, A1, paragraphs [0025],[0027],[0049], [0051] (Year: 2017).*
"3rd Generation Partnership Project; Technical Specification Group Radio Access Network; NR; Physical layer procedures for data", 3GPP TS 38.214 V1 5.0.0 (Dec. 2017).

*Primary Examiner* — Gerald A Smarth
(74) *Attorney, Agent, or Firm* — ScienBiziP, P.C.

(57) ABSTRACT

Transform precoding is applied to the complex value modulation symbol in a case that transform precoding is enabled for PUSCH, the prescribed modulation scheme is provided based at least on a first MCS table and an MCS field value included in the DCI format in a case that the DCI format includes a CRC scrambled by a TC-RNTI and the transform precoding is enabled for the PUSCH, and the prescribed modulation scheme is provided based on at least a second MCS table and/or the MCS field value in a case that the DCI format is a first uplink DCI format with the CRC scrambled (Continued)

by a C-RNTI, the transform precoding is enabled for the PUSCH, and a higher layer parameter MCS-Table-PUSCH-tp is set to a first value.

6 Claims, 8 Drawing Sheets

(51) Int. Cl.
  *H04W 76/11* (2018.01)
  *H04L 1/00* (2006.01)
  *H04W 72/04* (2009.01)

(52) U.S. Cl.
  CPC ... *H04W 72/0446* (2013.01); *H04W 72/0453* (2013.01); *H04W 72/1268* (2013.01); *H04W 76/11* (2018.02)

(56) References Cited

U.S. PATENT DOCUMENTS

| | | | |
|---|---|---|---|
| 2014/0169297 A1* | 6/2014 | Kim | H04L 1/0016 370/329 |
| 2014/0169300 A1* | 6/2014 | Kim | H04W 72/0413 370/329 |
| 2019/0150187 A1 | 5/2019 | Park et al. | |
| 2020/0187168 A1 | 6/2020 | Liu et al. | |

FOREIGN PATENT DOCUMENTS

| | | |
|---|---|---|
| WO | 2017/171956 A1 | 10/2017 |
| WO | 2018/016619 A1 | 1/2018 |

* cited by examiner

Figure A: Table of number of OFDM symbols per slot $N^{slot,\mu}_{symb}$ for subcarrier spacing configuration $\mu$ and normal cyclic prefix

| $\mu$ | slot_configuration | | | | | |
|---|---|---|---|---|---|---|
| | 0 | | | 1 | | |
| | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

Figure B: Table of number of OFDM symbols per slot $N^{slot,\mu}_{symb}$ for subcarrier spacing configuration $\mu$ and extended cyclic prefix

| $\mu$ | slot_configuration | | | | | |
|---|---|---|---|---|---|---|
| | 0 | | | 1 | | |
| | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 2 | 12 | 40 | 4 | 6 | 80 | 8 |

FIG. 2

| MCS Index $I_{MCS}$ | Modulation Order $Q_m$ | Target code Rate x [1024] $R$ | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 4

| MCS Index $I_{MCS}$ | Modulation Order $Q_m$ | Target code Rate x [1024] R | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

FIG. 5

| MCS Index $I_{MCS}$ | Modulation Order $Q_m$ | Target code Rate x 1024 R | Spectral efficiency |
|---|---|---|---|
| 0 | 1 | 240 | 0.2344 |
| 1 | 1 | 314 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |

FIG. 6

TERMINAL APPARATUS, BASE STATION APPARATUS, AND COMMUNICATION METHOD USING MODULATION AND CODING SCHEME TABLE

FIELD

The present disclosure relates to a terminal apparatus, a base station (BS) apparatus, and a communication method. This application claims the benefit of priority to Japanese Patent Application No. 2018-016262 filed on Feb. 1, 2018, which is incorporated herein by reference in its entirety.

BACKGROUND

A wireless access scheme and a wireless network of cellular mobile communication (hereinafter, referred to as "Long Term Evolution (LTE)" or "Evolved Universal Terrestrial Radio Access (EUTRA)") have been studied in the 3rd Generation Partnership Project (3GPP). In LTE, a BS apparatus is also referred to as an evolved NodeB (eNodeB), and a terminal apparatus is also referred to as user equipment (UE). LTE is a cellular communication system in which a plurality of areas are deployed in a cell structure, with each of the plurality of areas being covered by a BS apparatus. A single BS apparatus may manage a plurality of serving cells.

3GPP has been studying a next generation standard (New Radio or NR) (NPL 1) to make a proposal for International Mobile Telecommunication (IMT)-2020, a standard for a next-generation mobile communication system, standardized by the International Telecommunication Union (ITU). NR is required to satisfy requirements on the assumption of three scenarios including enhanced Mobile BroadBand (eMBB), massive Machine Type Communication (mMTC), and Ultra Reliable and Low Latency Communication (URLLC) in a single technology framework.

CITATION LIST

Non-Patent Literature

NPL 1: "New SID proposal: Study on New Radio Access Technology," RP-160671, NTT docomo, 3GPP TSG RAN Meeting #71, Goteborg, Sweden, 7 to 10 Mar. 2016.

SUMMARY

Technical Problem

One aspect of the present disclosure provides a terminal apparatus capable of efficiently performing communication, a communication method used in the terminal apparatus, a BS apparatus capable of efficiently performing communication, and a communication method used in the BS apparatus.

Solution To Problem (1) A first aspect of the present disclosure provides a terminal apparatus including: a receiver configured to receive a physical downlink control channel (PDCCH) including a downlink control information (DCI) format; and a transmitter configured to transmit a physical uplink shared channel (PUSCH) scheduled by using the DCI format, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first modulation and coding scheme (MC S) table and an MCS field value included in the first uplink DCI format in a case that the DCI format includes a cyclic redundancy check (CRC) scrambled by a temporary cell-radio network temporary identifier (TC-RNTI) and the transform precoding is enabled for the PUSCH, and the prescribed modulation scheme is provided based on at least a second MCS table and/or the MCS field value in a case that the DCI format is a first uplink DCI format with a CRC scrambled by cell-radio network temporary identifier (C-RNTI), the transform precoding is enabled for the PUSCH, and a higher layer parameter MCS-Table-PUSCH-tp is set to a first value.

(2) A second aspect of the present disclosure provides a terminal apparatus including: a receiver configured to receive a PDCCH including a DCI format; and a transmitter configured to transmit a PUSCH scheduled by the DCI format, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a C-RNTI, the transform precoding is enabled for the PUSCH, and a higher layer parameter MCS-Table-PUSCH-tp is not set to a first value, the prescribed modulation scheme is provided based on at least a second MCS table and the MCS field value in a case that the DCI format includes the CRC scrambled by the C-RNTI, the transform precoding is enabled for the PUSCH, and the higher layer parameter MCS-Table-PUSCH-tp is set to the first value, and the prescribed modulation scheme is provided based on at least the first MCS table and the MCS field value regardless of the value of the higher layer parameter MCS-Table-PUSCH-tp in a case that the DCI format includes a CRC scrambled by a TC-RNTI, and the transform precoding is enabled for the PUSCH.

(3) A third aspect of the present disclosure provides a BS apparatus including: a transmitter configured to transmit a PDCCH including a DCI format for scheduling a PUSCH; and a receiver configured to receive the PUSCH, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a TC-RNTI, and the transform precoding is enabled for the PUSCH, and the prescribed modulation scheme is provided based on at least a second MCS table and/or the MCS field value in a case that the DCI format is a first uplink DCI format with a CRC scrambled by a C-RNTI, the transform precoding is enabled for the PUSCH, and a higher layer parameter MCS-Table-PUSCH-tp is set to a first value.

(4) A fourth aspect of the present disclosure provides a BS apparatus including: a transmitter configured to transmit a PDCCH including a DCI format for scheduling a PUSCH; and a receiver configured to receive the PUSCH, a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a C-RNTI, the transform precoding is enabled for the PUSCH, and a higher layer parameter MCS-Table-PUSCH-tp is not set to a first value, the prescribed modulation scheme is provided based on at least a second MCS table and the MCS field value in a case that the DCI format includes the CRC scrambled by the C-RNTI, the transform precoding is enabled for the PUSCH, and the higher layer parameter MCS-Table-PUSCH-tp is set to the first value, and the prescribed modulation scheme is provided based on at least the first MCS table and the MCS field value regardless of the value of the higher layer parameter MCS-Table-PUSCH-tp in a case that the DCI format includes a CRC scrambled by a TC-RNTI, and the transform precoding is enabled for the PUSCH.

(5) A fifth aspect of the present disclosure provides a communication method for a terminal apparatus including: receiving a PDCCH including a DCI format; and transmitting a PUSCH scheduled by using the DCI format, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a TC-RNTI, and the transform precoding is enabled for the PUSCH, and the prescribed modulation scheme is provided based on at least a second MCS table and/or the MCS field value in a case that the DCI format is a first uplink DCI format with a CRC scrambled by a C-RNTI, the transform precoding is enabled for the PUSCH, and the higher layer parameter MCS-Table-PUSCH-tp is set to a first value.

(6) A sixth aspect of the present disclosure provides a communication method including: receiving a PDCCH including a DCI format; and transmitting a PUSCH scheduled by using the DCI format, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a C-RNTI, the transform precoding is enabled for the PUSCH, and a higher layer parameter MCS-Table-PUSCH-tp is not set to a first value, the prescribed modulation scheme is provided based on at least a second MCS table and the MCS field value in a case that the DCI format includes the CRC scrambled by the C-RNTI, the transform precoding is enabled for the PUSCH, and the higher layer parameter MCS-Table-PUSCH-tp is set to the first value, and the prescribed modulation scheme is provided based on at least the first MCS table and the MCS field value regardless of the value of the higher layer parameter MCS-Table-PUSCH-tp in a case that the DCI format includes a CRC scrambled by a TC-RNTI and the transform precoding is enabled for the PUSCH.

(7) A seventh aspect of the present disclosure provides a communication method including: transmitting a PDCCH including a DCI format for scheduling a PUSCH; and receiving the PUSCH, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a TC-RNTI, and the transform precoding is enabled for the PUSCH, and the prescribed modulation scheme is provided based on at least a second MCS table and/or the MCS field value in a case that the DCI format is a first uplink DCI format with a CRC scrambled by a C-RNTI, the transform precoding is enabled for the PUSCH, and a higher layer parameter MCS-Table-PUSCH-tp is set to a first value.

(8) An eighth aspect of the present disclosure provides a communication method including: transmitting a PDCCH including a DCI format for scheduling a PUSCH; and receiving the PUSCH, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a C-RNTI, the transform precoding is enabled for the PUSCH, and a higher layer parameter MCS-Table-PUSCH-tp is not set to a first value, the prescribed modulation scheme is provided based on at least a second MCS table and the MCS field value in a case that the DCI format includes the CRC scrambled by the C-RNTI, the transform precoding is enabled for the PUSCH, and the higher layer parameter MCS-Table-PUSCH-tp is set to the first value, and the prescribed modulation scheme is provided based on at least the first MCS table and the MCS field value regardless of the value of the higher layer parameter MCS-Table-PUSCH-tp in a case that the DCI format includes a CRC scrambled by a TC-RNTI, and the transform precoding is enabled for the PUSCH.

(9) A ninth aspect of the present disclosure provides a terminal apparatus including: a receiver configured to monitor a type-1 PDCCH common search space and a UE specific PDCCH search space; and a transmitter configured to transmit a PUSCH, in which a modulation scheme and a target coding rate for the PUSCH are provided based on at least a first table and a MCS field value included in a first uplink DCI format in a case that 1) transform precoding is enabled for the PUSCH, 2) the PUSCH is scheduled by using the first uplink DCI format with a first CRC in the UE specific PDCCH search space, 3) the first CRC is scrambled based on a C-RNTI, and 4) a parameter of a higher layer is set to a prescribed value, the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and the modulation scheme and the target coding rate for the PUSCH are provided based on at least the second table and an MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a TC-RNTI.

(10) A tenth aspect of the present disclosure provides a BS apparatus including: a configuration unit configured to configure a type-1 PDCCH common search space and a UE specific PDCCH search space; and a receiver configured to receive a PUSCH, in which a modulation scheme and a target coding rate for the PUSCH are provided based on at least a first table and a MCS field value included in a first uplink DCI format in a case that 1) transform precoding is enabled for the PUSCH, 2) the PUSCH is scheduled by using the first uplink DCI format with a first CRC in the UE specific PDCCH search space, 3) the first CRC is scrambled based on a C-RNTI, and 4) a parameter of a higher layer is set to a prescribed value, the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and the modulation scheme and the target coding rate for the PUSCH are provided based on at least the second table and an MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a TC-RNTI.

(11) An eleventh aspect of the present disclosure provides a communication method used for a terminal apparatus, the communication method including: monitoring a type-1 PDCCH common search space and a UE specific PDCCH search space; and transmitting a PUSCH, in which a modulation scheme and a target coding rate for the PUSCH are provided based at least on at least a first table and a MCS field value included in a first uplink DCI format in a case that 1) transform precoding is enabled for the PUSCH, 2) the PUSCH is scheduled by using the first uplink DCI format with a first CRC in the UE specific PDCCH search space, 3) the first CRC is scrambled based on a C-RNTI, and 4) a parameter of a higher layer is set to a prescribed value, the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and the modulation scheme and the target coding rate for the PUSCH are provided based on at least the second table and an MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a TC-RNTI.

(12) A twelfth aspect of the present disclosure provides a communication method used for a BS apparatus, the communication method including: configuring a type-1 PDCCH common search space and a UE specific PDCCH search space; and receiving a PUSCH, in which a modulation scheme and a target coding rate for the PUSCH are provided based on at least a first table and a MCS field value included in a first uplink DCI format in a case that 1) transform precoding is enabled for the PUSCH, 2) the PUSCH is scheduled by using the first uplink DCI format with a first CRC in the UE specific PDCCH search space, 3) the first CRC is scrambled based on a C-RNTI, and 4) a parameter of a higher layer is set to a prescribed value, the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and the modulation scheme and the target coding rate for the PUSCH are provided based on the second table and an MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a TC-RNTI.

Advantageous Effects

According to one aspect of the present disclosure, the terminal apparatus can efficiently perform communication. In addition, the BS apparatus can efficiently perform communication.

BRIEF DESCRIPTION OF DRAWINGS

FIG. 2 is an example illustrating a relationship of $N^{slot}_{symb}$, a subcarrier spacing configuration μ, a slot configuration, and a CP configuration according to an aspect of the present disclosure.

FIG. 4 is an example of a first MCS table illustrating mapping of an MCS index, a PUSCH modulation scheme, a target coding rate, and a spectral efficiency according to an aspect of the present disclosure.

FIG. 5 is an example of a second MCS table illustrating mapping of an MCS index, a PUSCH modulation scheme, a target coding rate, and a spectral efficiency according to an aspect of the present disclosure.

FIG. 6 is an example of a third MCS table illustrating mapping of an MCS index, a PUSCH modulation scheme, a target coding rate, and a spectral efficiency according to an aspect of the present disclosure.

DESCRIPTION

Implementations of the present disclosure will be described below.

Figure 1:
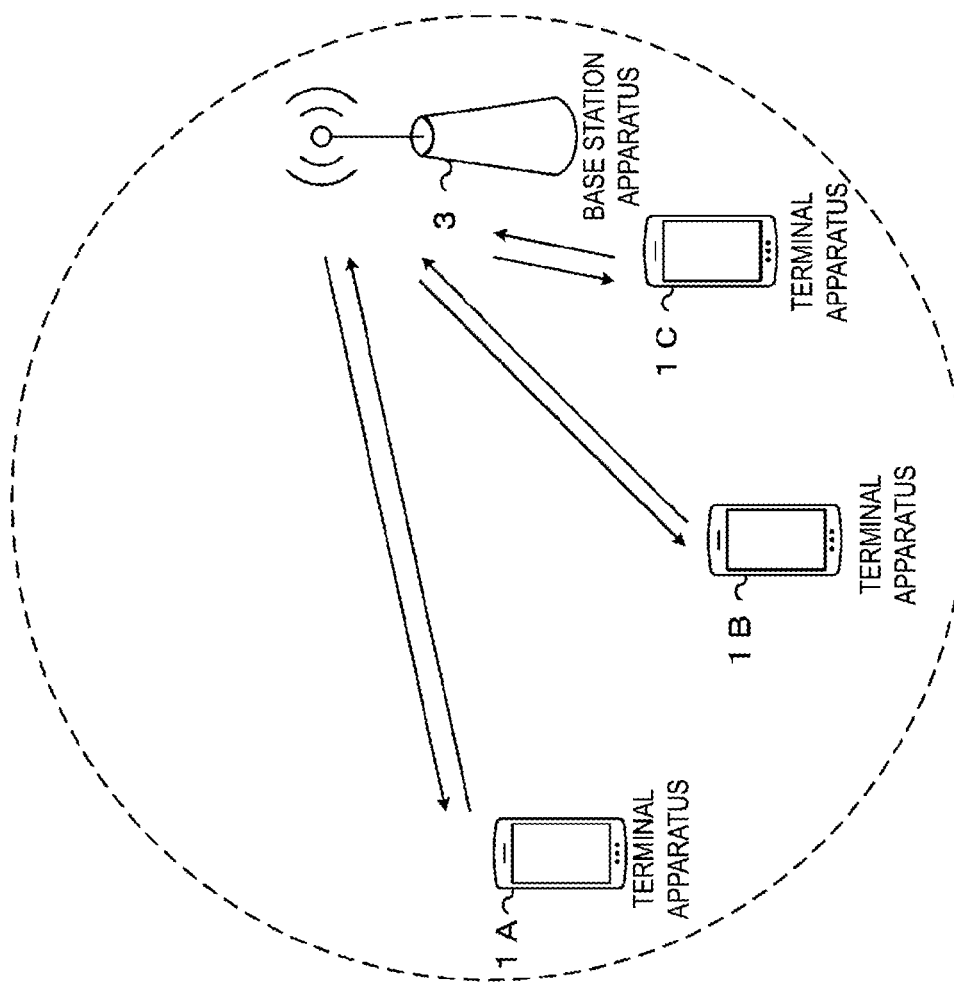
FIG. 1 is a conceptual diagram of a radio communication system according to an aspect of the present disclosure.

FIG. 1 is a conceptual diagram of a radio communication system according to an aspect of the present disclosure. In FIG. 1, the radio communication system includes terminal apparatuses 1A to 1C and a BS apparatus 3. Hereinafter, each the terminal apparatuses 1A to 1C will also be referred to as a terminal apparatus 1.

Hereinafter, a frame configuration will be described.

In the radio communication system according to an aspect of the present disclosure, at least orthogonal frequency division multiplexing (OFDM) is used. The OFDM symbol is a unit of a time domain of the OFDM. The OFDM symbol includes at least one or a plurality of subcarriers. The OFDM symbol is converted into a time-continuous signal in generation of a baseband signal.

A subcarrier spacing (SCS) may be given by an equation of a subcarrier spacing $\Delta f = 2^\mu \cdot 15$ kHz. For example, a subcarrier spacing configuration $\mu$ may be configured as any of 0, 1, 2, 3, 4, and/or 5. For a carrier bandwidth part (CBP), the subcarrier spacing configuration $\mu$ may be provided by a parameter of a higher layer.

In the radio communication system according to an aspect of the present disclosure, a time unit $T_c$ is used for expressing a length in the time domain. The time unit $T_c$ may be given by an equation of $T_c = 1/(\Delta f_{max} \cdot N_f)$. $\Delta f_{max}$ may be the maximum value of the subcarrier spacing supported by the radio communication system according to an aspect of the present disclosure. As for $\Delta f_{max}$, $\Delta f_{max} = 480$ kHz may be satisfied. As for $N_f$, $N_f = 4096$ may be satisfied. As for constant $\kappa$, $\kappa = \Delta f_{max} N_f/(\Delta f_{ref} N_{f,ref}) = 64$. $\Delta f_{ref}$ may be 15 kHz. $N_{f,ref}$ may be 2048.

The constant $\kappa$ may be a value indicating a relationship between a reference subcarrier spacing and $T_c$. The constant $\kappa$ may be used for the length of a subframe. The number of slots included in the subframe may be provided based on at least the constant $\kappa$. $\Delta f_{ref}$ is a reference subcarrier spacing, and $N_{f,ref}$ is a value corresponding to the reference subcarrier spacing.

Downlink (DL) transmission and/or uplink (UL) transmission includes 10 ms frames. A frame is configured to include 10 subframes. The length of the subframe is 1 ms. The length of the frame may be provided regardless of the subcarrier spacing $\Delta f$. In other words, the frame configuration may be provided regardless of $\mu$. The length of the subframe may be provided regardless of the subcarrier spacing $\Delta f$. In other words, the subframe configuration may be provided regardless of $\mu$.

For a certain subcarrier spacing configuration $\mu$, the number and indexes of slots included in a subframe may be provided. For example, a first slot number $n^\mu_s$ may be given in ascending order ranging from 0 to $N^{subframe,\mu}_{slot}-1$ within a subframe. For the subcarrier spacing configuration $\mu$, the number and indexes of slots included in a frame may be provided. For example, a second slot number $n^\mu_{s,f}$ may be provided in ascending order ranging from 0 to $N^{frame,\mu}_{slot}-1$ within a frame. $N^{slot}_{symb}$ consecutive OFDM symbols may be included in one slot. $N^{slot}_{symb}$ may be provided based at least one of or both a slot configuration and/or a cyclic prefix (CP) configuration. The slot configuration may be provided by a parameter slot_configuration of a higher layer. The CP configuration may be provided based on at least a parameter of a higher layer. The CP configuration may be provided based on at least dedicated RRC signaling. Each of the first slot number and the second slot number is also referred to as a slot number (slot index).

FIG. 2 is an example illustrating a relationship of $N^{slot}_{symb}$, the subcarrier spacing configuration $\mu$, the slot configuration, and the CP configuration according to an aspect of the present disclosure. In a case in which the slot configuration is zero, the subcarrier spacing configuration $\mu$ is two, and the CP configuration is a normal cyclic prefix (normal CP) in FIG. 2A, $N^{slot}_{symb}=14$, $N^{frame,\mu}_{slot}=40$, and $N^{subframe,\mu}_{slot}=4$. In addition, in a case in which the slot configuration is zero, the subcarrier spacing configuration is two, and the CP configuration is an extended cyclic prefix (extended CP) in FIG. 2B, $N^{slot}_{symb}=12$, $N^{frame,\mu}_{slot}=40$, and $N^{subframe,\mu}_{slot}=4$. $N^{slot}_{symb}$ in the slot configuration 0 may correspond to twice $N^{slot}_{symb}$ in the slot configuration 1.

Physical resources will be described below.

An antenna port is defined in such a manner that a channel at one antenna port through which symbols are conveyed can be estimated from a channel at the same antenna port through which other symbols are conveyed. In a case in which a large scale property of the channel at one antenna port through which symbols are conveyed can be estimated from a channel at another antenna port through which symbols are conveyed, the two antenna ports are said to be quasi co-located (QCL). The large scale property may include at least long term performance of the channel. The large scale property includes at least some or all of delay spread, Doppler spread, Doppler shift, an average gain, an average delay, and spatial Rx parameters. A first antenna port and a second antenna port being QCL with respect to a beam parameter may mean that a reception beam assumed by the reception side for the first antenna port is the same as a reception beam assumed by the reception side for the second antenna port. The first antenna port and the second antenna port being QCL with respect to a beam parameter may mean that a transmission beam assumed by the reception side for the first antenna port is the same as a transmission beam assumed by the reception side for the second antenna port. In a case in which the large scale property of a channel at one antenna port through which symbols are conveyed can be estimated from a channel at another antenna port through which symbols are conveyed in the terminal apparatus 1, the two antenna port may be assumed to be QCL. The two antenna ports being QCL may mean that the two antenna ports are assumed to be QCL.

For each of the subcarrier spacing configuration and a carrier set, a resource grid including $N^\mu_{RB,x} N^{RB}_{sc}$ subcarriers and $N^{(\mu)}_{symb} N^{subframe,\mu}_{symb}$ OFDM symbols is provided. $N^\mu_{RB,x}$ may indicate the number of resource blocks provided for the subcarrier spacing configuration $\mu$ for a carrier x. $N^\mu_{RB,x}$ may indicate the maximum number of resource blocks provided for the subcarrier spacing configuration $\mu$ for the carrier x. The carrier x indicates either a DL carrier or a UL carrier. In other words, x is "DL" or "UL." $N^\mu_{RB}$ is a designation that includes $N^\mu_{RB,DL}$ and/or $N^\mu_{RB,UL}$. $N^{RB}_{sc}$ may indicate the number of subcarriers included in one resource block. At least one resource grid may be provided for each antenna port p and/or for each subcarrier spacing configuration $\mu$ and/or for each transmission direction configuration. The transmission direction includes at least DL and UL. Hereinafter, a set of parameters including at least some or all of the antenna port p, the subcarrier spacing configuration $\mu$, and the transmission direction configuration will also be referred to as a first radio parameter set. In other words, one resource grid may be provided for each first radio parameter set.

A carrier included in a serving cell in DL will be referred to as a DL carrier (or a DL component carrier). A carrier included in a serving cell in UL is referred to as a UL carrier (or a UL component carrier). The DL component carrier and the UL component carrier will collectively be referred to as component carriers.

Each element in the resource grid provided for each first radio parameter set will be referred to as a resource element. The resource element is identified by an index $k_{sc}$ of the frequency domain and an index $l_{sym}$ of the time domain. For a certain first radio parameter set, a resource element is identified by an index $k_{sc}$ of the frequency domain and an index $l_{sym}$ of the time domain. The resource element identified by the index $k_{sc}$ of the frequency domain and the index $l_{sym}$ of the time domain will also be referred to as a resource element ($k_{sc}$, $l_{sym}$). The index $k_{sc}$ of the frequency domain indicates any of values from 0 to $N^{\mu}_{RB}N^{RB}_{sc}-1$. $N^{\mu}_{RB}$ may be the number of resource blocks provided for the subcarrier spacing configuration μ. $N^{RB}_{sc}$ is the number of subcarriers included in a resource block, and $N^{RB}_{sc}=12$. The index $k_{sc}$ of the frequency domain may correspond to a subcarrier index $k_{sc}$. The index $l_{sym}$ of the time domain may correspond to an OFDM symbol index $l_{sym}$.

Figure 3:
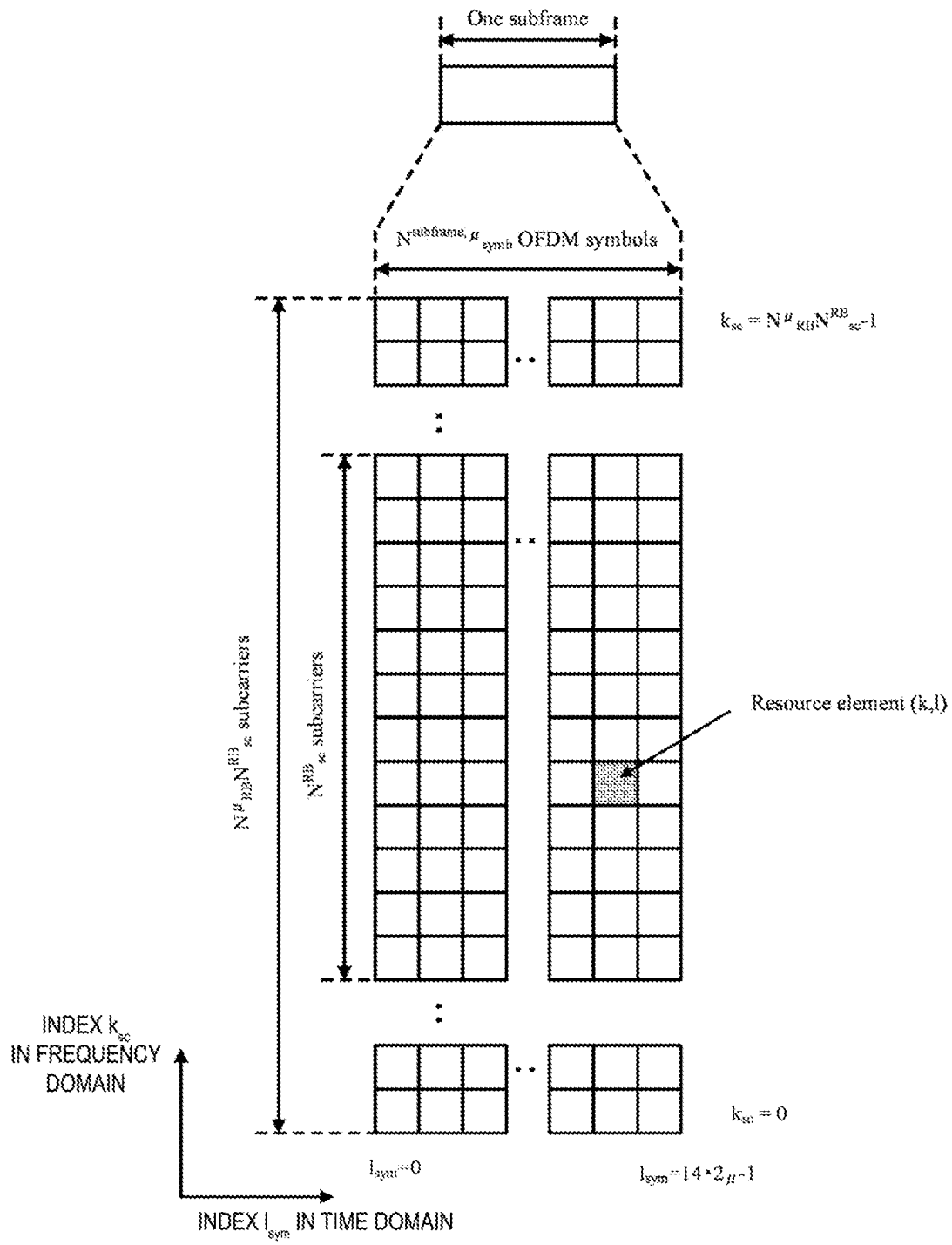
FIG. 3 is a schematic diagram illustrating an example of a resource grid in a subframe according to an aspect of the present disclosure.

FIG. 3 is a schematic diagram illustrating an example of a resource grid in a subframe according to an aspect of the present disclosure. In the resource grid of FIG. 3, the horizontal axis represents the index $l_{sym}$ of the time domain while the vertical axis is the index $k_{sc}$ of the frequency domain. In one subframe, the frequency domain of the resource grid includes $N^{\mu}_{RB}N^{RB}_{sc}$ subcarriers. In one subframe, the time domain of the resource grid may include 14·2 μ OFDM symbols. One resource block is configured to include $N^{RB}_{sc}$ subcarriers. The time domain of the resource block may correspond to one OFDM symbol. The time domain of the resource block may correspond to fourteen OFDM symbols. The time domain of the resource block may correspond to one or a plurality of slots. The time domain of the resource block may correspond to one subframe.

The terminal apparatus 1 may receive indication to perform transmission/reception using only a subset of resource grids. The subset of the resource grid is also referred to as a carrier bandwidth part, and the carrier bandwidth part may be provided based on at least a parameter of a higher layer and/or a part or an entire of DCI. The carrier bandwidth part is also referred to as a bandwidth part (BP). In other words, the terminal apparatus 1 may not receive indication to perform transmission/reception using all sets of resource grids. In other words, the terminal apparatus 1 may receive indication to perform transmission/reception using some frequency resources within the resource grids. One carrier bandwidth part may include a plurality of resource blocks in the frequency domain. One carrier bandwidth part may include a plurality of consecutive resource blocks in the frequency domain. A carrier bandwidth part is also referred to as a bandwidth part (BWP). A carrier bandwidth part configured for a DL carrier is also referred to as a DL carrier bandwidth part. A carrier bandwidth part configured for a UL carrier is also referred to as a UL carrier bandwidth part.

A set of DL carrier bandwidth parts may be configured for each serving cell. The set of DL carrier bandwidth parts may include one or a plurality of DL carrier bandwidth parts. A set of UL carrier bandwidth parts may be configured for each serving cell. The set of UL carrier bandwidth parts may include one or a plurality of UL carrier bandwidth parts.

The parameter of the higher layer is a parameter included in a signal of a higher layer. The signal of the higher layer may be radio resource control (RRC) signaling or a medium access control element (MAC CE). Here, the signal of the higher layer may be a signal of the RRC layer or a signal of the MAC layer.

The signal of the higher layer may be common RRC signaling. The common RRC signaling may include at least some or all of the following features C1 to C3.

Feature C1) Mapped to a BCCH logical channel or to a CCCH logical channel.
Feature C2) Including at least radioResourceConfigCommon information element.
Feature C3) Mapped to a PBCH.

The radioResourceConfigCommon information element may include information indicating a configuration commonly used in a serving cell. The configuration commonly used in the serving cell may include at least a Physical Random Access Channel (PRACH) configuration. The PRACH configuration may indicate at least one or a plurality of random access preamble indexes. The PRACH configuration may indicate at least time/frequency resources of the PRACH.

The higher layer signaling may be dedicated RRC signaling. The dedicated RRC signaling may include at least some or all of the following features D1) and D2.

Feature D1) Mapped to a dedicated control channel (DCCH) logical channel.
Feature D2) Including at least a radioResourceConfigDedicated information element.

The radioResourceConfigDedicated information element may include at least information indicating a configuration specific to the terminal apparatus 1. The radioResourceConfigDedicated information element may include at least information indicating a configuration of a carrier bandwidth part. The configuration of the carrier bandwidth part may indicate at least a frequency resource of the carrier bandwidth part.

For example, a master information block (MIB), first system information, and second system information may be included in the common RRC signaling. In addition, a message of a higher layer that is mapped to the DCCH logical channel and includes at least radioResourceConfigCommon may be included in the common RRC signaling. In addition, a message of a higher layer that is mapped to the DCCH logical channel and does not include the radioResourceConfigCommon information element may be included in the dedicated RRC signaling. In addition, a message of a higher layer message that is mapped to the DCCH logical channel and includes at least the radioResourceConfigDedicated information element may be included in the dedicated RRC signaling.

The first system information may include at least a time index of a synchronization signal (SS) block. The SS block is also referred to as an SS/Physical Broadcast CHannel (PBCH) block. The first system information may include at least information related to a PRACH resource. The first system information may include at least information related to a configuration of initial connection. The second system information may be system information other than the first system information.

The radioResourceConfigDedicated information element may include at least information related to the PRACH resource. The radioResourceConfigDedicated information element may include at least information related to the configuration of initial connection.

Hereinafter, physical channels and physical signals according to various aspects of the present disclosure will be described.

An uplink physical channel may correspond to a set of resource elements that convey information generated in a higher layer. The UL physical channel is a physical channel used in the UL carrier. In the radio communication system according to an aspect of the present disclosure, at least some or all of the UL physical channels described below are used.

Physical Uplink Control Channel (PUCCH)
PUSCH
PRACH

The PUCCH may be used to transmit uplink control information (UCI). The UCI includes some or all of channel state information (CSI), a scheduling request (SR), and a hybrid automatic repeat request acknowledgement (HARQ-ACK) corresponding to a transport block ((TB), a medium access control protocol data unit (MAC PDU), a DL-shared channel (DL-SCH), a physical downlink shared channel (PDSCH)).

The HARQ-ACK may include at least a HARQ-ACK bit corresponding to at least one transport block. The HARQ-ACK bit may indicate an acknowledgement (ACK) or a negative-acknowledgement (NACK) corresponding to one or a plurality of transport blocks. The HARQ-ACK may include at least a HARQ-ACK codebook including one or a plurality of HARQ-ACK bits. The HARQ-ACK bit corresponding to one or a plurality of transport blocks may mean that the HARQ-ACK bit corresponds to the PDSCH including one or a plurality of transport blocks.

The HARQ-ACK bit may indicate an ACK or a NACK corresponding to one code block group (CBG) included in a transport block. The HARQ-ACK is also referred to as HARQ feedback, HARQ information, or HARQ control information.

The scheduling request may be used at least to request PUSCH resources for initial transmission.

The channel state information may include at least some or all of a channel quality indicator (CQI), a precoder matrix indicator (PMI), and a rank indicator (RI). The CQI is an indicator related to channel quality (propagation strength, for example) while the PMI is an indicator indicating a precoder. The RI is an indicator indicating a transmission rank (or the number of transmission layers).

The PUSCH is used at least to transmit a transport block (TB, MAC PDU, UL-SCH, PUSCH). The PUSCH may be used at least to transmit some or all of the transport block, the HARQ-ACK, the channel state information, and the scheduling request. The PUSCH is used at least to transmit a random access message 3.

The PUSCH may be provided (generated) based on at least some or all of scrambling, modulation, layer mapping, transform precoding, precoding, and mapping to resource blocks.

The scrambling is to scramble a bit block $b_{seq}$ based on a scrambling sequence $c_{seq}$ and output a bit sequence $b^s_{seq}$. $b_{seq}(i_1)$ indicates the $i_1$-th bit value of the bit block $b_{seq}$. $i^1_{seq}$ indicates an integer value ranging from 0 to $M_{bit}$-1. $b^{seq}(i_1)$ indicates the $i_1$-th bit value of the bit block $b^s_{seq}$. $c_{seq}(i_1)$ indicates the $i_1$-th bit value of a scrambling sequence. $M_{bit}$ indicates the number of bits included in the bit block $b_{seq}$. The bit $b_{seq}(i_1)$ is also referred to as a coded bit of the transport block. The bit $b_{seq}(i_1)$ is also referred to as a coded bit of a codeword. The bit block $b_{seq}$ may be passed from a higher layer.

The bit $b^s_{seq}(i_1)$ is provided based on at least $b^s_{seq}(i_1)$=mod($b^s_{seq}(i_1)$+$c_{cseq}(i_1)$,2). mod (X, Y) may be a function of outputting the remainder of X divided by Y. mod (X, Y) may be a function of outputting the remainder of division of X by Y. $b_{seq}(i_1)$ may correspond to a coded bit of data. $b^s_{seq}(i_1)$ may correspond to a coded bit of CQI. $b^s_{seq}(i_1)$ may correspond to a coded bit of a rank. $b^s_{seq}(i_1)$ may correspond to a coded bit of HARQ-ACK.

The scrambling sequence $c_{seq}$ may be provided based on at least a cell ID.

Modulation is to modulate the bit block $b^s_{seq}$ based on the prescribed modulation scheme and output a complex value modulation symbol $d_{seq}$. The $d_{seq}(i_2)$ indicates the $i_2$-th complex value modulation symbol of the complex value modulation symbol $d_{seq}$. $i_2$ indicates an integer value ranging from 0 to $M_{symb}$-1. $M_{symb}$ indicates the number of complex value modulation symbols included in the complex value modulation symbol $d_{seq}$. In a case in which transform precoding is disabled for the PUSCH, the prescribed modulation scheme may include at least some or all of quadrature phase shift keying (QPSK), 16 quadrature amplitude modulation (16 QAM), 64 QAM, and/or 256 QAM. In a case in which the transform precoding is enabled for the PUSCH, the prescribed modulation scheme may include at least some or all of the π/2-binary phase shift keying (BPSK), QPSK, 16 QAM, 64 QAM, and/or 256 QAM. The transform precoding being disabled for the PUSCH may mean that the transform precoding is not to be applied to the PUSCH. The transform precoding being enabled for the PUSCH may mean that the transform precoding is to be applied to the PUSCH. Whether or not the transform precoding is enabled for the PUSCH may be provided based on at least a parameter of a higher layer. The transform precoding being disabled for the PUSCH may mean that the transform precoding is not enabled for the PUSCH. A method for selecting the prescribed modulation scheme will be described later.

The layer mapping is to map the complex value modulation symbol $d_{seq}$ to one or a plurality of layers and output a vector block $x^{layer}_{seq}$. $x^{layer}_{seq}(i_3)$ indicates the $i_3$-th vector of the vector block $x^{layer}_{seq}$. $i_3$ is an integer value ranging from 0 to $M^{layer}_{seq}$-1. $M^{layer}_{seq}$ indicates the number of vectors included in the vector block $x^{layer}_{seq}$. $x^{layer}_{seq}(i3)_3)=[x^{(0)}_{seq}(i_3), \ldots x^{(v-1)}_{seq}(i_3)]T$ is met. $[A_1, \ldots A_x]$ represents a row vector provided by each element from an element $A_1$ to element $A_x$. $A^T$ represents the transposition of the row vector A. v indicates the number of layers. v may be any value from 1 to 4. $x^{(\lambda)}_{seq}(i_3)$ is the $i_3$-th complex value modulation symbol of the λ-th layer complex value modulation symbol $x^{(\lambda)}_{seq}$.

The transform precoding is to output a vector block $y^{layer}_{seq}$ based on the vector block $x^{layer}_{seq}$. $y^{layer}_{seq}(i_4)$ indicates the $i_4$-th vector of the vector block $y^{layer}_{seq}$. $i_4$ indicates an integer value ranging from 0 to $M^{layer}_{seq}$-1. $y^{layer}_{seq}(i_4)=[y^{(0)}_{seq}(i_4), \ldots, y^{(v-1)}_{seq}(i_4)]$ is met. $y^{(\lambda)}_{seq}(i_4)$ is the $i_4$-th complex value modulation symbol of the complex value modulation symbol $y^{(\lambda)}_{seq}$ of the λ-th layer.

In a case in which the transform precoding is disabled for the PUSCH, $y^{(\lambda)}_{seq}$ is set to $x^{(\lambda)}_{seq}$. In a case in which the transform precoding is enabled for the PUSCH, $y^{(\lambda)}_{seq}$ may be provided based on the prescribed transform precoding being applied to $x^{(\lambda)}_{seq}$. The prescribed transform precoding is also referred to as discrete Fourier transform (DFT) precoding. $y^{(\lambda)}_{seq}$ may be provided by Equation (1).

$$y^{(\lambda)}_{seq}(l \cdot M^{PUSCH}_{sc} + k) = \frac{1}{\sqrt{M^{PUSCH}_{sc}}} \sum_{i=0}^{M^{PUSCH}_{sc}-1} x^{(\lambda)}_{seq}(l \cdot M^{PUSCH}_{sc} + i)e^{-j\frac{2\pi i k}{M^{PUSCH}_{sc}}}$$ [Equation 1]

In Equation (1), k is an index of the frequency domain. k indicates an integer value ranging from 0 to $P^{PUSCH}_{sc}$-1. l is an index of the time domain. l indicates an integer value ranging from 0 to $M^{layer}_{seq}/M^{PUSCH}_{sc}$-1.

$M^{PUSCH}{}_{sc} = M^{PUSCH}{}_{RB} \cdot M^{RB}{}_{sc}$ is met. $M^{PUSCH}{}_{RB}$ indicates a band of the PUSCH provided by the number of resource blocks. In other words, $M^{PUSCH}{}_{sc}$ may indicate the number of subcarriers of the PUSCH. In a case that transform precoding is enabled for the PUSCH, $v=1$ may be met.

The index k of the frequency domain may indicate the index of the frequency domain in the band to which the PUSCH is allocated. The index of the time domain may indicate the index of the time domain in the OFDM symbol to which the PUSCH is allocated.

The precoding is to apply precoding W to the vector block $y^{layer}{}_{seq}$ and output the vector block $z^{ap}{}_{seq}$. p is an index of an antenna port. $z^{ap}{}_{seq}(i_5)$ indicates the $i_5$-th vector of the vector block $z^{ap}{}_{seq}$. $i_5$ indicates an integer value ranging from 0 to $M^{ap}{}_{seq}-1$. $M^{ap}{}_{seq}$ indicates the number of vectors included in the vector block $z^{ap}{}_{seq}$. $z^{ap}{}_{seq}(i_5) = [z^{(0)}{}_{seq}(i_5), \ldots, z^{(P-1)}{}_{seq}(i_5)]$ is met. $z^{(P)}{}_{seq}(i_5)$ is an $i_5$-th complex value modulation symbol of the complex value modulation symbol $z^{(P)}{}_{seq}$ of the p-th antenna port. The precoding W being applied to the vector block $y^{layer}{}_{seq}$ may mean that the vector block $y^{ylayer}{}_{seq}$ may be multiplied by the precoding W.

The resource block mapping is to map the vector block $z^{ap}{}_{seq}$ to resource blocks.

The PRACH may be used at least to transmit a random access preamble (random access message 1). The PRACH may be used at least to indicate some or all of an initial connection establishment procedure, a handover procedure, a connection re-establishment procedure, synchronization with PUSCH transmission (timing adjustment) and a request for resources for the PUSCH. The random access preamble may be used to notify the BS apparatus 3 of an index (random access preamble index) provided by a higher layer of the terminal apparatus 1.

The random access preamble may be provided by a Zadoff-Chu sequence corresponding to a physical root sequence index u being cyclic-shifted. The Zadoff-Chu sequence may be generated based on the physical root sequence index u. In one serving cell, a plurality of random access preambles may be defined. A random access preamble may be identified based on at least an index of the random access preamble. A different random access preamble corresponding to a different index of the random access preamble may correspond to a different combination of the physical root sequence index u and the cyclic shift. The physical root sequence index u and the cyclic shift may be provided based on at least information included in system information. The physical root sequence index u may be an index for identifying a sequence included in the random access preamble. The random access preamble may be specified based on at least the physical root sequence index u.

In FIG. 1, the following UL physical signals are used for UL radio communication. The UL physical signals may not be used to transmit information output from a higher layer but are used by a physical layer.
UL Demodulation Reference Signal (UL DMRS)
Sounding Reference Signal (SRS)
UL Phase Tracking Reference Signal (UL PTRS)

The UL DMRS is related to transmission of the PUSCH and/or the PUCCH. The UL DMRS is multiplexed with the PUSCH or the PUCCH. The BS apparatus 3 may use the UL DMRS in order to perform channel compensation of the PUSCH or the PUCCH. Hereinafter, transmission of both the PUSCH and the UL DMRS related to the PUSCH will simply be referred to as transmission of the PUSCH. Hereinafter, transmission of both a PUCCH and a UL DMRS associated with the PUCCH will simply be referred to as transmission of the PUCCH. The UL DMRS related to the PUSCH will also be referred to as a UL DMRS for the PUSCH. The UL DMRS related to the PUCCH will also be referred to as a UL DMRS for the PUCCH.

The sequence r(m) of the DMRS for the PUSCH may be provided based on at least the identifier $n_{SCID}$ related to the DMRS for the PUSCH. The sequence r(m) of the DMRS for the PUSCH may be provided based on Equation (2) and Equation (3).

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

$$c_{init} = \mod(2^{17}(14n_s + l + 1)(2N_{ID} + 1) + 2N_{ID} + n_{SCID}, 2^{31}) \quad \text{[Equation 3]}$$

c(x) may be an x-th value of a pseudo-random sequence c. The pseudo-random sequence c may be generated using at least a gold sequence. The length of the gold sequence may be 31. $C_{init}$ may be a value used for initialization of the pseudo-random sequence c. $N_{ID}$ may be provided based on at least the cell ID.

SRS may not be related to transmission of the PUSCH or the PUCCH. The BS apparatus 3 may use the SRS for measuring a channel state. The SRS may be transmitted at the end of a subframe in a UL slot or in an OFDM symbol in an order of a prescribed number from the end.

The UL PTRS may be a reference signal that is used at least for phase tracking. The UL PTRS may be related to a UL DMRS group including at least an antenna port used for one or a plurality of UL DMRSs. The UL PTRS and the UL DMRS group being related to each other may mean that the antenna port of the UL PTRS and at least some or all of the antenna ports included in the UL DMRS group are QCL. The UL DMRS group may be identified based on at least the antenna port of the smallest index for the UL DMRS included in the UL DMRS group. The UL PTRS may be mapped to the antenna port of the smallest index in one or a plurality of antenna ports to which one codeword is mapped. In a case that one codeword is mapped at least to a first layer and a second layer, the UL PTRS may be mapped to the first layer. The UL PTRS may not be mapped to the second layer. The index of the antenna port to which the UL PTRS is mapped may be provided based on at least DCI.

In FIG. 1, the following DL physical channels are used for DL radio communication from the BS apparatus 3 to the terminal apparatus 1. The DL physical channels are used by the physical layer for transmission of information output from a higher layer.
PBCH;
PDCCH;
Physical Downlink Shared CHannel (PDSCH).

The PBCH is used at least to transmit an MIB or a broadcast channel BCH. The PBCH may be transmitted based on a prescribed transmission interval. The PBCH may be transmitted at an interval of 80 ms. The PBCH may be transmitted at an interval of 160 ms. Contents of information included in the PBCH may be updated at every 80 ms. A part or an entirety of information included in the PBCH may be updated at every 160 ms. The PBCH may include 288 subcarriers. The PBCH may include 2, 3, or 4 OFDM symbols. The MIB may include information related to an identifier (index) of a synchronization signal. The MIB may include information indicating at least some of the numbers of the slot, the subframe, and/or the radio frame through which the PBCH is transmitted.

The PDCCH is used at least to transmit DCI. The PDCCH including at least the DCI may be transmitted. The PDCCH may include the DCI. The DCI is also referred to as a DCI format. The DCI may include at least either a DL grant or a UL grant. The DCI format used to schedule the PDSCH is also referred to as a downlink DCI format. The DCI format used to schedule the PUSCH is also referred to as an uplink DCI format. The DL grant is also referred to as DL assignment or DL allocation. The uplink DCI format includes at least one of or both a first uplink DCI format and a second uplink DCI format.

The first uplink DCI format is configured to include at least some or all of 1A to 1F.

1A) Identifier for DCI formats field;
1B) Frequency domain resource assignment field;
1C) Time domain resource assignment field;
1D) Frequency hopping flag field;
1E) MCS field;
1F) First CSI request field.

The identifier for the DCI formats field may be used at least to indicate which of one or a plurality of DCI formats the DCI format including the identifier for the DCI formats fields corresponds to. The one or the plurality of DCI formats may be provided based on at least some or all of the downlink DCI format, the first uplink DCI format, and/or the second uplink DCI format. The one or the plurality of DCI formats may include at least some or all of the downlink DCI format, the first uplink DCI format, and/or the second uplink DCI format.

The frequency domain resource allocation field may be used at least to indicate allocation of frequency resources for the PUSCH scheduled by the DCI format including the frequency domain resource allocation field.

The time domain resource allocation field may be used at least to indicate allocation of time resources for the PUSCH scheduled by the DCI format including the time domain resource allocation field.

The frequency hopping flag field may be used at least to indicate whether or not frequency hopping is to be applied to the PUSCH scheduled by the DCI format including the frequency hopping flag field.

The MCS field may be used at least to indicate some or all of a modulation scheme and/or a target coding rate for the PUSCH scheduled by the DCI format including the MCS field. The target coding rate may be a target coding rate for a transport block of the PUSCH. The transport block size (TBS) may be provided based on at least the target coding rate.

FIG. 4 is an example of a first MCS table illustrating mapping of the MCS index, the PUSCH modulation scheme, the target coding rate, and the spectral efficiency according to an aspect of the present disclosure. The MCS field indicates an MCS index. Each MCS index may correspond to some or all of the modulation scheme, the target coding rate, and/or the spectral efficiency. In FIG. 4, for example, the MCS index 0 corresponds to the modulation order of the modulation scheme=2, the target coding rate=120/1024, and the spectral efficiency=0.2344. Here, the modulation order of the modulation scheme may correspond to the number of bits transmitted in one resource element. The QPSK modulation scheme may correspond to the modulation order of the modulation scheme being two. The 16 QAM modulation scheme may correspond to the modulation order of the modulation scheme being four. The 64 QAM modulation scheme may correspond to the modulation order of the modulation scheme being six. The first MCS table may be configured to include at least some or all of a set of the MCS index, the modulation scheme corresponding to the MCS index, the target coding rate, and/or the spectral efficiency included in FIG. 4.

The target coding rates and the spectral efficiency corresponding to the MCS indexes 29, 30, and 31 in FIG. 4 are configured as being reserved. The MCS index corresponding to the target coding rates configured as being reserved and/or the spectral efficiency configured as being reserved is also referred to as a special MCS index (special MCS field). In other words, the MCS indexes 29, 30, and 31 in FIG. 4 are special MCS indexes. Some or all of the target coding rates and/or the spectral efficiency corresponding to the MCS indexes 29, 30, and 31 in FIG. 4 may be provided based on at least the MCS indexes included in the latest DCI format for scheduling transmission of the PUSCH corresponding to the same transport block. The size of the transport block corresponding to the PUSCH scheduled by the PDCCH including the DCI format including the MCS field that indicates any of the MCS indexes 29, 30, and 31 in FIG. 4 may be provided based on at least information included in the PDCCH that includes the DCI format including the MCS field indicating any of the MCS indexes 0 to 28, the PDCCH being the latest PDCCH for the transport block. Here, the information included in latest PDCCH may include at least some or all of the MCS field, the frequency domain resource allocation field, and the time domain resource allocation field.

In other words, some or all of the target coding rates and/or the spectral efficiency corresponding to the special MCS indexes may be provided based on at least the MCS indexes includes in the latest DCI format for scheduling the transmission of the PUSCH corresponding to the same transport block. The transport block size corresponding to the PUSCH scheduled by the PDCCH including the DCI format including the MCS fields that indicate the MCS indexes corresponding to the special MCS indexes may be provided based on at least information included in the PDCCH that includes the DCI format including MCS fields that do not indicate the special MCS indexes, the PDCCH being the latest PDCCH for the transport block.

FIG. 5 is an example of a second MCS table illustrating mapping of an MCS index, a PUSCH modulation scheme, a target coding rate, and spectral efficiency according to an aspect of the present disclosure. Each MCS index may correspond to some or all of the modulation scheme, the target coding rate, and/or the spectral efficiency. For example, the second MCS table may be configured to include at least some or all of a set of the MCS indexes, the modulation scheme corresponding to the MCS index, the target coding rate, and/or the spectral efficiency included in FIF. 5. The MCS indexes 28, 29, 30, and 31 in FIG. 5 are special MCS indexes.

FIG. 6 is an example of a third MCS table illustrating mapping of an MCS index, a PUSCH modulation scheme, a target coding rate, and the spectral efficiency according to an aspect of the present disclosure. Each MCS index may correspond to some or all of the modulation scheme, the target coding rate, and/or the spectral efficiency. In FIG. 6, for example, the MCS index 0 corresponds to the modulation order of the modulation scheme=2, the target coding rate=120/1024, and the spectral efficiency=0.2344. The third MCS table may be configured to include at least some or all of a set of the MCS index, the modulation scheme corresponding to the MCS index, the target coding rate, and/or the spectral efficiency included in FIG. 6. The MCS indexes 29, 30, and 31 in FIG. 6 are special MCS indexes.

A fourth MCS table may be the same as the second MCS table. The fourth MCS table may be different from the second MCS table. The fourth MCS table may be configured to include at least some or all of a set of the MCS index, the modulation scheme corresponding to the MCS index, the target coding rate, and/or the spectral efficiency included in FIG. 5.

The first CSI request field is used at least to indicate a CSI report. The size of the first CSI request field may be a prescribed value. The size of the first CSI request field may be 0, 1, 2, or 3.

The second uplink DCI format is configured to include at least some or all of 2A to 2G.
2A) Identifier for DCI formats field;
2B) Frequency domain resource assignment field;
2C) Time domain resource assignment field;
2D) Frequency hopping flag field;
2E) MCS field;
2F) Second CSI request field;
2G) DMRS sequence initialization field.

The second CSI request field is used at least to indicate a CSI report. The size of the second CSI request field may be provided based on at least a parameter ReportTriggerSize of a higher layer.

The identifier $n_{SCID}$ related to the DMRS for the PUSCH may be provided by the DMRS sequence initialization field. The size of the DMRS sequence initialization field may be zero bits in a case that the transform precoding is enabled for the PUSCH scheduled by the DCI format including the DMRS initialization field. The size of the DMRS sequence initialization field may be one bit in a case that the transform precoding is disabled for the PUSCH scheduled by the DCI format including the DMRS initialization field.

In various aspects of the present disclosure, the number of resource blocks indicates the number of resource blocks in the frequency domain unless otherwise particularly indicated.

The DL grant is used at least for scheduling one PDSCH in one serving cell.

The UL grant is used at least for scheduling one PUSCH in one serving cell.

One physical channel may be mapped to one serving cell. One physical channel is mapped to one carrier bandwidth part configured for one carrier included in one serving cell.

In the terminal apparatus 1, one or a plurality of control resource sets (CORESETs) may be configured. The terminal apparatus 1 monitors the PDCCH in one or a plurality of control resource sets (monitor).

The control resource set may indicate a time-frequency domain to which one or a plurality of PDCCHs can be mapped. The control resource set may be a domain in which the terminal apparatus 1 monitors the PDCCH. The control resource set may include consecutive resources (localized resources). The control resource set may include non-consecutive resources (distributed resources).

In the frequency domain, a unit of mapping the control resource set may be resource blocks. In the frequency domain, for example, the unit of mapping the control resource set may be six resource blocks. In the time domain, the unit of mapping the control resource set may be OFDM symbols. In the time domain, for example, the unit of mapping the control resource set may be one OFDM symbol.

The frequency domain of the control resource set may be provided based on at least higher layer signaling and/or DCI.

The time domain of the control resource set may be provided based on at least higher layer signaling and/or DCI.

A certain control resource set may be a common control resource set. The common control resource set may be a control resource set configured commonly for a plurality of terminal apparatuses 1. The common control resource set may be provided based on at least some or all of an MIB, first system information, second system information, common RRC signaling, and a cell ID. For example, the time resource and/or the frequency resource of the control resource set configured to monitor the PDCCH to be used for scheduling of the first system information may be provided based on at least the MIB.

A certain control resource set may be a dedicated control resource set. The dedicated control resource set may be a control resource set configured to be used dedicatedly for the terminal apparatus 1. The dedicated control resource set may be provided based on at least some or all of dedicated RRC signaling and a C-RNTI value.

The set of PDCCH candidates monitored by the terminal apparatus 1 may be defined from a viewpoint of a search space. In other words, the set of PDCCH candidates monitored by the terminal apparatus 1 may be provided by the search space.

The search space may be configured to include one or a plurality of PDCCH candidates of one or a plurality of aggregation levels. The aggregation level of the PDCCH candidate may indicate the number of CCEs constituting the PDCCH.

The terminal apparatus 1 may monitor at least one or a plurality of search spaces in a slot for which no discontinuous reception (DRX) is configured. DRX may be provided based on at least a parameter of a higher layer. The terminal apparatus 1 may monitor at least one or a plurality of search space sets in a slot for which no DRX is configured.

A search space set may be configured to include at least one or a plurality of search spaces. The search space set may include at least some or all of a type-0 PDCCH common search space (CSS), a type-1 PDCCH common search space, and/or a UE specific search space (USS). The type-0 PDCCH common search space may be configured at least for monitoring a first uplink DCI format. The type-1 PDCCH common search space may be configured at least for monitoring the first uplink DCI format. The type-0 PDCCH common search space may not be configured for monitoring a second uplink DCI format. The type-1 PDCCH common search space may not be configured for monitoring the second uplink DCI format. The UE specific search space may be configured at least for monitoring some or all of the first uplink DCI format and/or the second uplink DCI format.

Each search space set may be related to one control resource set. Each search space set may be included in one control resource set. An index of a control resource set related to the search space set may be provided to each search space set.

The type-0 PDCCH common search space may be used at least for the DCI format with a CRC sequence scrambled by system information-radio network temporary identifier (SI-RNTI). A configuration of a control resource set related at least to the type-0 PDCCH common search space may be provided based on at least a parameter RMSI-PDCCH-Config of a higher layer. The parameter RMSI-PDCCH-Config of the higher layer may be included in the MIB. The parameter RMSI-PDCCH-Config of the higher layer may indicate at least one of or both the number of resource blocks included in the control resource set related at least to the type-0 PDCCH common search space and the number of OFDM symbols included in the control resource set. The parameter RMSI-PDCCH-Config of the higher layer may be indicated by an information field included in the MIB.

The type-1 PDCCH common search space may be used at least for the DCI format that accompanies a CRC sequence scrambled by a random access-radio network temporary identifier (RA-RNTI), a CRC sequence scrambled by a TC-RNTI, and/or a CRC sequence scrambled by a C-RNTI. The RA-RNTI may be provided based on at least time/frequency resources of a random access preamble transmitted by the terminal apparatus 1. The TC-RNTI may be provided by a PDSCH (also referred to as a message 2 or a random access response grant) scheduled by a DCI format with a CRC sequence scrambled by the RA-RNTI. The C-RNTI may be provided based on at least a PDSCH (also referred to as a message 4 or a contention resolution) scheduled by a DCI format with a CRC sequence scrambled by the TC-RNTI.

The UE specific search space may be used at least for a DCI format with a CRC sequence scrambled by the C-RNTI.

The common control resource set may include at least one of or both the CSS and the USS. The dedicated control resource set may include at least one of or both the CSS and the USS.

A physical resource of the search space includes a control channel element (CCE) of the control channel. The CCE includes a prescribed number of resource element groups (REGs). For example, the CCE may include six REGs. The REG may include one OFDM symbol in one physical resource block (PRB). In other words, the REG may include twelve resource elements (REs). The PRB is also simply referred to as a resource block (RB).

The PDSCH is used at least to transmit the transport block. The PDSCH may be used at least to transmit a random access message 2 (random access response). The PDSCH may be used at least to transmit system information including a parameter used for an initial access.

In FIG. 1, the following DL physical signals are used for the DL radio communication. The DL physical signals may not be used for transmitting information output from a higher layer but are used by a physical layer.
SS;
DL Demodulation Reference Signal (DL DMRS);
Channel State Information-Reference Signal (CSI-RS);
DL Phase Tracking Reference Signal (DL PTRS);
Tracking Reference Signal (TRS).

The synchronization signal is used by the terminal apparatus 1 to establish synchronization in the DL in the frequency domain and/or the time domain. The synchronization signal includes a primary synchronization signal (PSS) and a secondary SS (SSS).

An SS block (SS/PBCH block) is configured to include at least some or all of the PSS, the SSS, and the PBCH. Antenna ports of some or all of the PSS, the SSS, and the PBCH included in the SS block may be the same. Some or all of the PSS, the SSS, and the PBCH included in the SS block may be mapped to consecutive OFDM symbols. CP configurations of some or all of the PSS, the SSS, and the PBCH included in the SS block may be the same. Subcarrier spacing configurations μ of some or all of the PSS, the SSS, and the PBCH included in the SS block may be the same.

The DL DMRS is related to transmission of the PBCH, the PDCCH and/or the PDSCH. The DL DMRS is multiplexed with the PBCH, the PDCCH and/or the PDSCH. The terminal apparatuses 1 may use the DL DMRS corresponding to the PBCH, the PDCCH, or the PDSCH in order to perform channel compensation of the PBCH, the PDCCH or the PDSCH. Hereinafter, both the PBCH and the DL DMRS related to the PBCH being transmitted is referred to as the PBCH being transmitted. Hereinafter, both the PDCCH and the DL DMRS related to the PDCCH being transmitted is simply referred to as the PDCCH being transmitted. Also, both the PDSCH and the DL DMRS related to the PDSCH being transmitted is simply referred to as the PDSCH being transmitted. The DL DMRS related to the PBCH is also referred to as a DL DMRS for the PBCH. The DL DMRS related to the PDSCH is also referred to as a DL DMRS for the PDSCH. The DL DMRS related to the PDCCH is also referred to as a DL DMRS related to the PDCCH.

The DL DMRS may be a reference signal individually configured for the terminal apparatus 1. The sequence of the DL DMRS may be provided based on at least a parameter individually configured for the terminal apparatus 1. The sequence of the DL DMRS may be provided based on at least a UE specific value (for example, a C-RNTI or the like). The DL DMRS may be individually transmitted for the PDCCH and/or the PDSCH.

The CSI-RS may be a signal used at least to calculate channel state information. A pattern of the CSI-RS assumed by the terminal apparatus may be provided at least by a parameter of a higher layer.

The PTRS may be a signal used at least to compensate for phase noise. A pattern of the PTRS assumed by the terminal apparatus may be provided based on at least a parameter of a higher layer and/or DCI.

The DL PTRS may be related to a DL DMRS group that includes at least an antenna port used for one or a plurality of DL DMRSs. The DL PTRS and the DL DMRS group being associated with each other may mean that at least the antenna port of the DL PTRS and some or all of the antenna ports included in the DL DMRS group are QCL. The DL DMRS group may be identified based on at least the antenna port of the smallest index for the DL DMRS included in the DL DMRS group.

The TRS may be a signal used at least for time and/or frequency synchronization. A pattern of the TRS assumed by the terminal apparatus may be provided based on at least a parameter of a higher layer and/or DCI.

The DL physical channels and the DL physical signals are also referred to as DL signals. The UL physical channels and the UL physical signals are also referred to as UL signals. The DL signals and the UL signals are collectively referred to as physical signals. The DL signals and the UL signals are also collectively referred to as signals. The DL physical channels and the UL physical channels are collectively referred to as physical channels. The DL physical signals and the UL physical signals are collectively referred to as physical signals.

The broadcast channel (BCH), the UL-shared channel (UL-SCH), and the DL-shared channel (DL-SCH) are transport channels. A channel used in a medium access control (MAC) layer is referred to as a transport channel. A unit of the transport channel used in the MAC layer is also referred to as a transport block (TB) or a MAC PDU. A HARQ is controlled for each transport block in the MAC layer. The transport block is a unit of data that the MAC layer delivers to the physical layer. In the physical layer, the transport block is mapped to a codeword, and modulation processing is performed for each codeword.

The BS apparatus 3 and the terminal apparatus 1 exchange (transmit and/or receive) signals of a higher layer through the higher layer. For example, the BS apparatus 3 and the terminal apparatus 1 may transmit and/or receive RRC signaling (an RR message, RRC information) through the RRC layer. Furthermore, the BS apparatus 3 and the terminal apparatus 1 may transmit and/or receive a MAC control element (CE) through the MAC layer. Here, the RRC signaling and/or the MAC CE is also referred to as higher layer signaling.

The PUSCH and the PDSCH are used at least to transmit the RRC signaling and/or the MAC CE. Here, the RRC signaling transmitted from the BS apparatus 3 through the PDSCH may be signaling common to a plurality of terminal apparatuses 1 in a serving cell. The signaling common to the plurality of terminal apparatuses 1 in the serving cell is also referred to as common RRC signaling. The RRC signaling transmitted from the BS apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A parameter of a higher layer specific to a serving cell may be transmitted by using the signaling common to the plurality of terminal apparatuses 1 in the serving cell or the signaling dedicated to a certain terminal apparatus 1. A UE-specific parameter of a higher layer may be transmitted using the signaling dedicated to the certain terminal apparatus 1.

A broadcast control channel (BCCH), a common control channel (CCCH), and a DCCH are logical channels. For example, the BCCH is a higher layer channel used to transmit MIB. Also, the CCCH is a higher layer channel used to transmit information common to the plurality of terminal apparatuses 1. Here, the CCCH may be used for a terminal apparatus 1 without RRC connection, for example. Also, the DCCH is a higher layer channel used at least to transmit dedicated control information to the terminal apparatus 1. Here, the DCCH may be used for the terminal apparatus 1 with RRC connection, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

Hereinafter, a configuration example of the terminal apparatus 1 according to an aspect of the present disclosure will be described.

Figure 7:
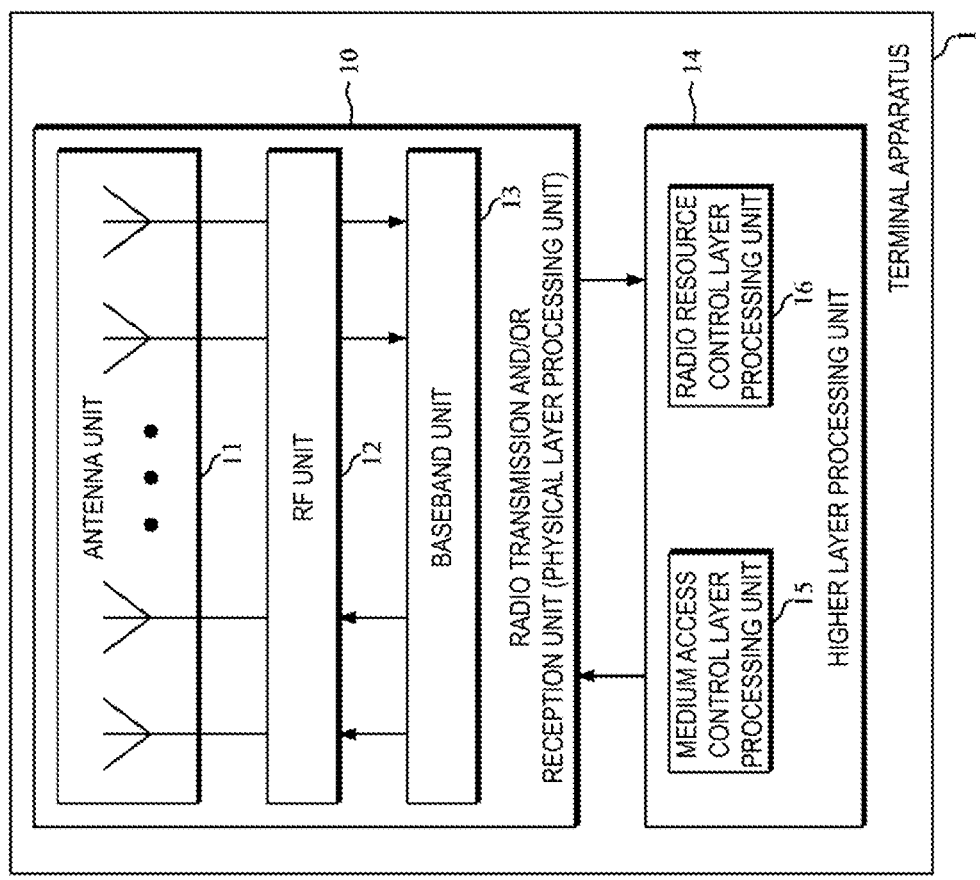
FIG. 7 is a schematic block diagram illustrating a configuration of a terminal apparatus according to an aspect of the present disclosure.

FIG. 7 is a schematic block diagram illustrating a configuration of the terminal apparatus 1 according to an aspect of the present disclosure. As illustrated, the terminal apparatus 1 is configured to include a radio transmission and/or reception unit 10 and a higher layer processing unit 14. The radio transmission and/or reception unit 10 is configured to include at least some or all of an antenna unit 11, a radio frequency (RF) unit 12, and a baseband unit 13. The higher layer processing unit 14 is configured to include at least some or all of a medium access control layer processing unit 15 and a radio resource control layer processing unit 16. The radio transmission and/or reception unit 10 is also referred to as a transmitter, a receiver, or a physical layer processing unit.

The higher layer processing unit 14 outputs UL data (transport block) generated by a user operation or the like to the radio transmission and/or reception unit 10. The higher layer processing unit 14 performs processing on a MAC layer, a packet data convergence protocol (PDCP) layer, a radio link control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1 itself. The radio resource control layer processing unit 16 sets various types of configuration information/parameters based on signals of a higher layer received from the BS apparatus 3. In other words, the radio resource control layer processing unit 16 sets the various configuration information/parameters based on the information indicating the various configuration information/parameters received from the BS apparatus 3. The parameters may be parameters of a higher layer.

The radio transmission and/or reception unit 10 performs processing of the physical layer, such as modulation, demodulation, coding, and decoding. The radio transmission and/or reception unit 10 demultiplexes, demodulates, and decodes a received physical signal and outputs the decoded information to the higher layer processing unit 14. The radio transmission and/or reception unit 10 generates a physical signal by performing modulation and coding of data and generating a baseband signal (conversion into a time consecutive signal) and transmits the physical signal to the BS apparatus 3.

The RF unit 12 converts (down-converts) a signal received via the antenna unit 11 into a baseband signal through orthogonal demodulation and removes unnecessary frequency components therefrom. The RF unit 12 outputs a processed analog signal to the baseband unit.

The baseband unit 13 converts the analog signal input from the RF unit 12 into a digital signal. The baseband unit 13 removes a portion corresponding to a CP from the converted digital signal, performs a fast Fourier transform (FFT) on the signal from which the CP has been removed, and extracts a signal in the frequency domain.

The baseband unit 13 generates an OFDM symbol by performing inverse FFT (IFFT) on the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Also, the RF unit 12 amplifies power. In addition, the RF unit 12 may be provided with a function of controlling power to be transmitted. The RF unit 12 will also be referred to as a transmitted power control unit.

Hereinafter, a configuration example of the BS apparatus 3 according to an aspect of the present disclosure will be described.

Figure 8:
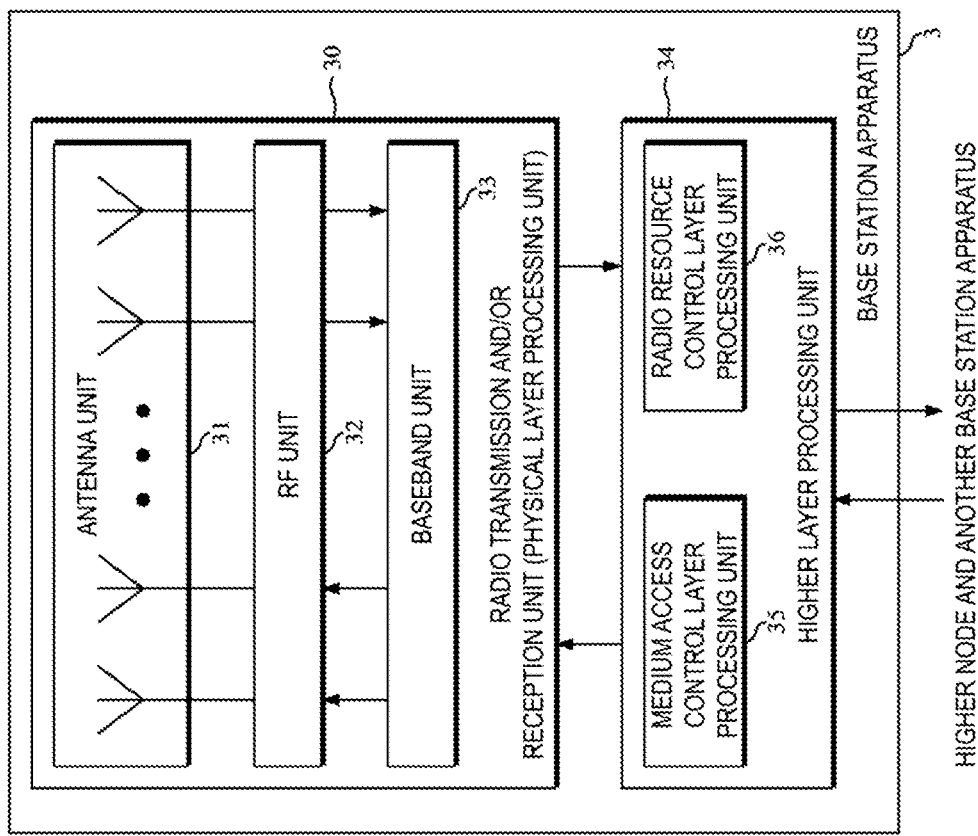
FIG. 8 is a schematic block diagram illustrating a configuration of a BS apparatus according to an aspect of the present disclosure.

FIG. 8 is a schematic block diagram illustrating a configuration of the BS apparatus 3 according to an aspect of the present disclosure. As illustrated, the BS apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 will also be referred to as a transmitter, a receiver, or a physical layer processing unit.

The higher layer processing unit 34 performs processing on a MAC layer, a PDCP layer, an RLC layer, and an RRC layer.

The medium access control layer processing unit 35 included in the higher layer processing unit 34 performs processing on the MAC layer.

The radio resource control layer processing unit 36 included in the higher layer processing unit 34 performs processing on the RRC layer. The radio resource control layer processing unit 36 generates, or acquires from a higher node, DL data (transport block) allocated in a PDSCH, system information, an RRC message, a MAC CE, and the like, and outputs the data to the radio transmission and/or reception unit 30. Also, the radio resource control layer processing unit 36 manages various types of configuration information/parameters for each terminal apparatus 1. The radio resource control layer processing unit 36 may set various types of configuration information/parameters for each terminal apparatus 1 via signals of a higher layer. In other words, the radio resource control layer processing unit 36 transmits/reports information indicating various types of configuration information/parameters.

Since the functions of the radio transmission and/or reception unit 30 are similar to the functions of the radio transmission and/or reception unit 10, description thereof will be omitted.

Each of the units with the reference signs 10 to 16 applied thereto in the terminal apparatus 1 may be configured as a circuit. Each of the units with the reference signs 30 to 36 applied thereto in the BS apparatus 3 may be configured as a circuit.

Hereinafter, various aspect examples according to an aspect of the present disclosure will be described.

In a case in which the transform precoding is disabled for the PUSCH scheduled by a first uplink DCI format with a CRC scrambled by the C-RNTI, and a higher layer parameter MCS-Table-PUSCH is not set to a first value, the modulation scheme for the PUSCH and/or target coding rate for the transport block of the PUSCH may be provided based on at least an MCS field value included in the first uplink DCI format and a first MCS table. The first value may indicate that an MCS index corresponding to 256 QAM is included in the MCS table for the PUSCH for which the transform precoding is disabled. The first MCS table may not include the MCS index corresponding to 256 QAM.

In a case that the transform precoding is disabled for the PUSCH scheduled by the first uplink DCI format with the CRC scrambled by the C-RNTI, and a higher layer parameter MCS-Table-PUSCH is set to a first value, the modulation scheme for the PUSCH and/or the target coding rate for the transport block of the PUSCH may be provided based on at least an MCS index for the PUSCH and a second MCS table. The MCS index may be provided based on the MCS field included in the first uplink DCI format. The second MCS table may include at least one MCS index corresponding to 256 QAM.

In a case that the transform precoding is enabled for the PUSCH scheduled by the first uplink DCI format with a CRC scrambled by the C-RNTI, and a higher layer parameter MCS-Table-PUSCH-tp is not set to a second value, the modulation scheme for the PUSCH and/or the target coding rate for the transport block of the PUSCH may be provided based on at least the MCS field value included in the first uplink DCI format and a third MCS table. The second value may indicate that the MCS index corresponding to 256 QAM is included in the MCS table for the PUSCH for which the transform precoding is enabled. The third MCS table may not include the MCS index corresponding to 256 QAM.

In a case that the transform precoding is enabled for the PUSCH scheduled by the first uplink DCI format with the CRC scrambled by the C-RNTI, and the higher layer parameter MCS-Table-PUSCH-tp is set to the second value, the modulation scheme for the PUSCH and/or the target coding rate for the transport block of the PUSCH may be provided based on at least the MCS field value included in the first uplink DCI format and a fourth MCS table. The fourth MCS table may include at least one MCS index corresponding to 256 QAM.

In a case that the transform precoding is disabled for the PUSCH scheduled by a second uplink DCI format with a CRC scrambled by the C-RNTI, and the higher layer parameter MCS-Table-PUSCH is not set to the first value, the modulation scheme for the PUSCH and/or the target coding rate for the transport block of the PUSCH may be provided based on at least an MCS field value included in the second uplink DCI format and the first MCS table.

In a case that the transform precoding is disabled for the PUSCH scheduled by the second uplink DCI format with the CRC scrambled by the C-RNTI, and the higher layer parameter MCS-Table-PUSCH is set to the first value, the modulation scheme for the PUSCH and the target coding rate for the transport block of the PUSCH may be provided based on at least the MCS field value included in the second uplink DCI format and the second MCS table.

In a case that the transform precoding is enabled for the PUSCH scheduled by the second uplink DCI format with the CRC scrambled by the C-RNTI, and the higher layer parameter MCS-Table-PUSCH-tp is not set to a second value, the modulation scheme for the PUSCH and/or the target coding rate for the transport block of the PUSCH may be provided based on at least the MCS field value included in the second uplink DCI format and the third MCS table.

In a case that the transform precoding is enabled for the PUSCH scheduled by the second uplink DCI format with the CRC scrambled by the C-RNTI, the higher layer parameter MCS-Table-PUSCH-tp is set to the second value, the modulation scheme for the PUSCH and/or the target coding rate for the transport block of the PUSCH may be provided based on at least the MCS field value included in the second UPLINK DCI format and the fourth MCS table.

In a case that the transform precoding is disabled for the PUSCH scheduled by the first uplink DCI format with a CRC scrambled by a TC-RNTI, the modulation scheme for the PUSCH and/or the target coding rate for the transport block of the PUSCH may be provided based on at least the MCS field value included in the first uplink DCI format and the first MCS table.

In a case that the transform precoding is enabled for the PUSCH scheduled by the first uplink DCI format with the CRC scrambled by the TC-RNTI, the modulation scheme for the PUSCH and/or the target coding rate for the transport block of the PUSCH may be provided based on at least the MCS field value included in the first uplink DCI format and the third MCS table.

In a case that the transform precoding is disabled for the PUSCH scheduled by a random access response grant, the modulation scheme for the PUSCH and/or the target coding rate for the transport block of the PUSCH may be provided based on at least an MCS field value included in the random access response grant and the first MCS table.

In a case that the transform precoding is enabled for the PUSCH scheduled by the random access response grant, the modulation scheme for the PUSCH and/or the target coding rate for the transport block of the PUSCH may be provided based on at least the MCS field value included in the random access response grant and the third MCS table. The MCS index may be provided based on the MCS field included in the first uplink DCI format.

In a case that the transform precoding is disabled for the PUSCH scheduled by the first uplink DCI format with the CRC scrambled by the TC-RNTI, the modulation scheme for the PUSCH and/or the target coding rate for the transport block of the PUSCH may be provided on the assumption that the higher layer parameter MCS-Table-PUSCH is set to the first value. In a case that the transform precoding is disabled for the PUSCH scheduled by the first uplink DCI format with the CRC scrambled by the TC-RNTI, the modulation scheme for the PUSCH and/or the target coding rate for the transport block of the PUSCH may be provided regardless of whether or not the higher layer parameter MCS-Table-PUSCH is set to the first value.

In a case that the transform precoding is enabled for the PUSCH scheduled by the first uplink DCI format with the CRC scrambled by the TC-RNTI, the modulation scheme for the PUSCH and/or the target coding rate for the transport block of the PUSCH may be provided on the assumption that the higher layer parameter MCS-Table-PUSCH-tp is set to the second value. In a case that the transform precoding is enabled for the PUSCH scheduled by the first uplink DCI format with the CRC scrambled by the TC-RNTI, the modulation scheme for the PUSCH and/or the target coding rate for the transport block of the PUSCH may be provided regardless of whether or not the higher layer parameter MCS-Table-PUSCH-tp is set to the second value.

In a case that the transform precoding is disabled for the PUSCH scheduled by the random access response grant, the modulation scheme for the PUSCH and/or the target coding rate for the transport block of the PUSCH may be provided based on the higher layer parameter MCS-Table-PUSCH being set to the first value. In a case that the transform precoding is disabled for the PUSCH scheduled by the random access response grant, the modulation scheme for the PUSCH and/or the target coding rate for the transport block of the PUSCH may be provided regardless of whether or not the higher layer parameter MCS-Table-PUSCH is set to the first value.

In a case that the transform precoding is enabled for the PUSCH scheduled by the random access response grant, the modulation scheme for the PUSCH and/or the target coding rate for the transport block of the PUSCH may be provided based on the higher layer parameter MCS-Table-PUSCH-tp being set to the second value. In a case that the transform precoding is enabled for the PUSCH scheduled by the random access response grant, the modulation scheme for the PUSCH and/or the target coding rate for the transport block of the PUSCH may be provided regardless of whether or not the higher layer parameter MCS-Table-PUSCH-tp is set to the second value.

The transform precoding being enabled for the PUSCH may mean that the parameter PUSCH-tp is set to a third value. The third value may indicate that the transform precoding is enabled for the PUSCH. The transform precoding being disabled for the PUSCH may mean that the higher layer parameter PUSCH-tp is not set to the third value.

Whether or not the transform precoding is to be applied to the PUSCH for the PUSCH scheduled by the first uplink DCI format with the CRC scrambled by the C-RNTI may be provided based on at least the parameter PUSCH-tp being set to the value of a parameter transform-precoding-scheduled of a higher layer.

Whether or not the transform precoding is to be applied to the PUSCH for the PUSCH scheduled by the second uplink DCI format with the CRC scrambled by the C-RNTI may be provided based on at least the parameter PUSCH-tp being set to the value of the parameter transform-precoding-scheduled of the higher layer.

Whether or not the transform precoding is to be applied to the PUSCH in transmission of the PUSCH scheduled by the first uplink DCI format with the CRC scrambled by the TC-RNTI may be provided based on at least the parameter PUSCH-tp being set to the value of a parameter msg3-tp of a higher layer.

Whether or not the transform precoding is to be applied to the PUSCH for the PUSCH scheduled by the random access response grant may be provided based on at least the parameter PUSCH-tp being set to the value of the parameter msg3-tp of the higher layer.

Whether or not the transform precoding is enabled for the PUSCH in the transmission of the PUSCH scheduled by the first uplink DCI format with the CRC scrambled by the C-RNTI may be provided based on at least the parameter transform-precoding-scheduled of the higher layer.

Whether or not the transform precoding is enabled for the PUSCH in the transmission of the PUSCH scheduled by the second uplink DCI format with the CRC scrambled by the C-RNTI may be provided based on at least the parameter transform-precoding-scheduled of the higher layer.

Whether or not the transform precoding is enabled for the PUSCH in the transmission of the PUSCH scheduled by the first uplink DCI format with the CRC scrambled by the TC-RNTI may be provided based on at least the parameter msg3-tp of the higher layer.

Whether or not the transform precoding is enabled for the PUSCH in the transmission of the PUSCH scheduled by the random access response grant may be provided based on at least the parameter msg3-tp of the higher layer.

In the present implementation, the second value may be the same as or different from the first value. In the present implementation, the third value may be the same as or different from the first value. In the present implementation, the third value may be the same as or different from the second value.

Hereinafter, various aspects of apparatuses according to one aspect of the present disclosure will be described.

(1) To accomplish the object described above, aspects of the present disclosure provide the following functions. Specifically, a first aspect of the present disclosure provides a terminal apparatus including: a receiver configured to receive a PDCCH including a DCI format; and a transmitter configured to transmit a PUSCH scheduled by using the DCI format, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a TC-RNTI and the transform precoding is enabled for the PUSCH, and the prescribed modulation scheme is provided based on at least a second MCS table and/or the MCS field value in a case that the DCI format is a first uplink DCI format with a CRC scrambled by a C-RNTI, the transform precoding is enabled for the PUSCH, and a higher layer parameter MCS-Table-PUSCH-tp is set to a first value.

(2) Also, a second aspect of the present disclosure provides a terminal apparatus including: a receiver configured to receive a PDCCH including a DCI format; and a transmitter configured to transmit a PUSCH scheduled by using the DCI format, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a C-RNTI, the transform precoding is enabled for the PUSCH, and a higher layer parameter MCS-Table-PUSCH-tp is not set to a first value, the prescribed modulation scheme is provided based on at least a second MCS table and the MCS field value in a case that the DCI format includes the CRC scrambled by the C-RNTI, the transform precoding is enabled for the PUSCH, and the higher layer parameter MCS-Table-PUSCH-tp is set to the first value, and the prescribed modulation scheme is provided based on at least the first MCS table and the MCS field value regardless of the value of the higher layer parameter MCS-Table-PUSCH-tp in a case that the DCI format includes a CRC scrambled by a TC-RNTI, and the transform precoding is enabled for the PUSCH.

(3) Also, a third aspect of the present disclosure provides a BS apparatus including: a transmitter configured to transmit a PDCCH including a DCI format for scheduling a PUSCH; and a receiver configured to receive the PUSCH, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by a TC-RNTI and the transform precoding is enabled for the PUSCH, and the prescribed modulation scheme is provided based on at least a second MCS table and/or the MCS field value in a case that the DCI format is a first uplink DCI format with a CRC scrambled by a C-RNTI, the transform precoding is enabled for the PUSCH, and a higher layer parameter MCS-Table-PUSCH-tp is set to a first value.

(4) Also, a fourth aspect of the present disclosure provides a BS apparatus including: a transmitter configured to transmit a PDCCH including a DCI format for scheduling a PUSCH; and a receiver configured to receive the PUSCH, in which a complex value modulation symbol is generated by a transport block of the PUSCH being modulated based on a prescribed modulation scheme, transform precoding is applied to the complex value modulation symbol in a case that the transform precoding is enabled for the PUSCH, the prescribed modulation scheme is provided based on at least a first MCS table and an MCS field value included in the DCI format in a case that the DCI format includes a CRC scrambled by C-RNTI, the transform precoding is enabled for the PUSCH, and a higher layer parameter MCS-Table-PUSCH-tp is not set to a first value, the prescribed modulation scheme is provided based on at least a second MCS table and the MCS field value in a case that the DCI format includes the CRC scrambled by the C-RNTI, the transform precoding is enabled for the PUSCH, and the higher layer parameter MCS-Table-PUSCH-tp is set to the first value, and the prescribed modulation scheme is provided based on at least the first MCS table and the MCS field value regardless of the value of the higher layer parameter MCS-Table-PUSCH-tp in a case that the DCI format includes a CRC scrambled by a TC-RNTI and the transform precoding is enabled for the PUSCH.

(5) A fifth aspect of the present disclosure provides a terminal apparatus including: a receiver configured to monitor a type-1 PDCCH common search space and a UE specific PDCCH search space; and a transmitter configured to transmit a PUSCH, in which a modulation scheme and a target coding rate for the PUSCH are provided based on at least a first table and an MCS field value included in a first uplink DCI format in a case that 1) transform precoding is enabled for the PUSCH, 2) the PUSCH is scheduled by using the first uplink DCI format with a first CRC in the UE specific PDCCH search space, 3) the first CRC is scrambled based on a C-RNTI, and 4) a parameter of a higher layer is set to a prescribed value, the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and the modulation scheme and the target coding rate for the PUSCH are provided based on the second table and an MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a TC-RNTI.

(6) A sixth aspect of the present disclosure provides a BS apparatus including: a configuration unit configured to configure a type-1 PDCCH common search space and a UE specific PDCCH search space; and a receiver configured to receive a PUSCH, in which a modulation scheme and a target coding rate for the PUSCH are provided based on at least a first table and an MCS field value included in a first uplink DCI format in a case that 1) transform precoding is enabled for the PUSCH, 2) the PUSCH is scheduled by using the first uplink DCI format with a first CRC in the UE specific PDCCH search space, 3) the first CRC is scrambled based on a C-RNTI, and 4) a parameter of a higher layer is set to a prescribed value, the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and the modulation scheme and the target coding rate for the PUSCH are provided based on the second table and the MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a TC-RNTI.

Each of programs running on the BS apparatus 3 and the terminal apparatus 1 according to the present disclosure may be a program (a program that causes a computer to function) adapted to control a central processing unit (CPU) or the like to realize functions of the aforementioned implementations according to the present disclosure. Also, the information handled by these apparatuses is temporarily accumulated in a random access memory (RAM) at the time of processing, is then stored in various read only memories (ROMs) such as a flash ROM or hard disk drives (HDDs), and when needed, is read, amended, and overwritten by the CPU.

It is noted that the terminal apparatus 1 and the BS apparatus 3 according to the aforementioned implementations may be partially realized by a computer. In that case, this configuration may be realized by recording a program for realizing such control functions on a computer-readable recording medium and causing a computer system to read and execute the program recorded on the recording medium.

It is noted that it is assumed that the "computer system" mentioned here refers to a computer system that is incorporated in the terminal apparatus 1 or the BS apparatus 3 and includes an OS and hardware such as a peripheral apparatus. Also, a "computer-readable recording medium" refers to a portable medium such as a flexible disk, a magneto-optical disk, a ROM, or a CD-ROM or a storage device such as a hard disk incorporated in the computer system.

Moreover, the "computer-readable recording medium" may also include a medium that dynamically retains a program for a short period of time, such as a communication line in a case in which the program is transmitted over a network such as the Internet or over a communication line such as a telephone line, or may also include a medium that retains the program for a fixed period of time, such as a volatile memory included in the computer system functioning as a server or a client in such a case. Also, the aforementioned program may be one for realizing some of the aforementioned functions, and also may be one capable of realizing the aforementioned functions in combination with a program that has already been recorded in the computer system.

Also, the BS apparatus 3 according to the aforementioned implementations may be realized as an aggregation (apparatus group) including a plurality of apparatuses. Each of the apparatuses included in such an apparatus group may include some or all of each function or each functional block of the BS apparatus 3 according to the aforementioned implementations. It is only necessary for the apparatus group to have a complete set of functions or functional blocks of the BS apparatus 3. Also, the terminal apparatus 1 according to the aforementioned implementations can also communicate with the BS apparatus as an aggregation.

In addition, the BS apparatus 3 according to the aforementioned implementations may be an Evolved Universal Terrestrial Radio Access Network (EUTRA) and/or a Next-Gen RAN (NG-RAN or NR RAN). Also, the BS apparatus 3 according to the aforementioned implementations may have some or all of the functions of a higher node for an eNodeB and/or a gNB.

Furthermore, some or all portions of the terminal apparatus 1 and the BS apparatus 3 according to the aforementioned implementations may be typically realized as LSIs which are integrated circuits or may be realized as chip sets. The functional blocks of the terminal apparatus 1 and the BS apparatus 3 may be individually achieved as chips, or some or all of the functional blocks may be integrated into a chip. Also, a circuit integration technique is not limited to the LSIs, and may be realized with dedicated circuits or general-purpose processors. In addition, in a case in which a circuit integration technology that replaces an LSI appears with advances in semiconductor technology, it is also possible to use an integrated circuit based on the technology.

Also, although the terminal apparatus has been described as an example of a communication apparatus in the aforementioned implementations, the present disclosure is not limited to such a terminal apparatus, and is applicable to a terminal apparatus or a communication apparatus of a fixed-type or a stationary-type electronic apparatus installed indoors or outdoors, for example, such as an AV apparatus, a kitchen apparatus, a cleaning or washing machine, an air-conditioning apparatus, office equipment, a vending machine, and other household apparatuses.

Although the implementations of the present disclosure have been described above in detail with reference to the drawings, the specific configuration is not limited to the implementations and includes, for example, design modifications that fall within the scope that does not depart from the gist of the present disclosure. Also, various modifications are possible within the scope of the present disclosure defined by claims, and implementations that are made by appropriately combining technical means disclosed in different implementations are also included in the technical scope of the present disclosure. In addition, configurations in which elements described in the aforementioned implementations and having similar effects are replaced are also included in the technical scope of the present disclosure.

What is claimed is:

1. A terminal apparatus, comprising:
   a memory that stores instructions; and
   a processor that executes the instructions stored in the memory to:
   monitor a type-I physical downlink control channel (PDCCH) common search space and a user equipment (UE) specific PDCCH search space; and
   transmit a physical uplink shared channel (PUSCH),
   wherein a modulation scheme and a target coding rate for the PUSCH are provided based on at least a first table and a modulation and coding scheme (MCS) field value included in a first uplink downlink control information (DCI) format in a case that I) transform precoding is enabled for the PUSCH, 2) the PUSCH is scheduled by using the first uplink DCI format with a first cyclic redundancy check (CRC) in the UE specific PDCCH search space, 3) the first CRC is scrambled based on a cell-radio network temporary identifier (C-RNTI), and 4) a parameter of a higher layer is set to a prescribed value,
   wherein the modulation scheme and the target coding rate for the PUSCH are provided based on at least a second table and the MCS field value included in the first uplink DCI format in a case that I) the transform precoding is enabled for the PUSCH, 2) the PUSCH is scheduled by using the first uplink DCI format with the first CRC in the UE specific PDCCH search space, and 3) the first CRC is scrambled based on the C-RNTI, and
   wherein the modulation scheme and the target coding rate for the PUSCH are provided based on the second table and an MCS field value included in a second uplink DCI format regardless of the parameter of the higher layer in a case that I) the transform precoding is enabled for the PUSCH, 2) the PUSCH is scheduled by using the second uplink DCI format with a second CRC in the type-I PDCCH common search space, and 3) the second CRC is scrambled based on a temporary cell-radio network temporary identifier (TC-RNTI).

2. The terminal apparatus according to claim 1, wherein the modulation scheme and the target coding rate for the PUSCH are provided based on a third table and the MCS field value included in the second uplink DCI format regardless of the parameter of the higher layer in a case that 1) the transform precoding is not enabled for the PUSCH, 2) the PUSCH is scheduled by using the second uplink DCI format with the second CRC in the type-1 PDCCH common search space, and 3) the second CRC is scrambled based on the TC-RNTI.

3. A base station (BS) apparatus, comprising:
a memory that stores instructions; and
a processor that executes the instructions stored in the memory to:
configure a type-1 physical downlink control channel (PDCCH) common search space and a user equipment (UE) specific PDCCH search space; and
receive a physical uplink shared channel (PUSCH),
wherein a modulation scheme and a target coding rate for the PUSCH are provided based on at least a first table and a modulation and coding scheme (MCS) field value included in a first uplink downlink control information (DCI) format in a case that 1) transform precoding is enabled for the PUSCH, 2) the PUSCH is scheduled by using the first uplink DCI format with a first cyclic redundancy check (CRC) in the UE specific PDCCH search space, 3) the first CRC is scrambled based on a cell-radio network temporary identifier (C-RNTI), and 4) a parameter of a higher layer is set to a prescribed value,
wherein the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and
wherein the modulation scheme and the target coding rate for the PUSCH are provided based on at least the second table and an MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a temporary cell-radio network temporary identifier (TC-RNTI).

4. The BS apparatus according to claim 3, wherein the modulation scheme and the target coding rate for the PUSCH are provided based on a third table and the MCS field value included in the second uplink DCI format regardless of the parameter of the higher layer in a case that 1) the transform precoding is not enabled for the PUSCH, 2) the PUSCH is scheduled by using the second uplink DCI format with the second CRC in the type-1 PDCCH common search space, and 3) the second CRC is scrambled based on the TC-RNTI.

5. A communication method used for a terminal apparatus, the communication method comprising:
monitoring a type-1 physical downlink control channel (PDCCH) common search space and a user equipment (UE) specific PDCCH search space; and
transmitting a physical uplink shared channel (PUSCH), wherein a modulation scheme and a target coding rate for the PUSCH are provided based on at least a first table and a modulation and coding scheme (MCS) field value included in a first uplink downlink control information (DCI) format in a case that 1) transform precoding is enabled for the PUSCH, 2) the PUSCH is scheduled by using the first uplink DCI format with a first cyclic redundancy check (CRC) in the UE specific PDCCH search space, 3) the first CRC is scrambled based on a cell-radio network temporary identifier (C-RNTI), and 4) a parameter of a higher layer is set to a prescribed value,
wherein the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and
wherein the modulation scheme and the target coding rate for the PUSCH are provided based on at least the second table and an MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a temporary cell-radio network temporary identifier (TC-RNTI).

6. A communication method used for a base station apparatus, the communication method comprising:
configuring a type-1 physical downlink control channel (PDCCH) common search space and a user equipment (UE) specific PDCCH search space; and
receiving a physical uplink shared channel (PUSCH),
wherein a modulation scheme and a target coding rate for the PUSCH are provided based on at least a first table and a modulation and coding scheme (MCS) field value included in a first uplink downlink control information (DCI) format in a case that 1) transform precoding is enabled for the PUSCH, 2) the PUSCH is scheduled by using the first uplink DCI format with a first cyclic redundancy check (CRC) in the UE specific PDCCH search space, 3) the first CRC is scrambled based on a cell-radio network temporary identifier (C-RNTI), and 4) a parameter of a higher layer is set to a prescribed value,
wherein the modulation scheme and the target coding rate for the PUSCH are provided based on at least a second table and the MCS field value included in the first uplink DCI format in a case that 1) the transform precoding is enabled for the PUSCH, 2) the PUSCH is scheduled by using the first uplink DCI format with the first CRC in the UE specific PDCCH search space, and 3) the first CRC is scrambled based on the C-RNTI, and
wherein the modulation scheme and the target coding rate for the PUSCH are provided based on the second table and an MCS field value included in a second uplink DCI format regardless of the parameter of the higher layer in a case that 1) the transform precoding is enabled for the PUSCH, 2) the PUSCH is scheduled by using the second uplink DCI format with a second CRC in the type-1 PDCCH common search space, and 3) the second CRC is scrambled based on a temporary cell-radio network temporary identifier (TC-RNTI).

* * * * *